June 1, 1926. Re. 16,357

H. FRANKEL

COMBINATION GARMENT FOR FEMININE WEAR

Original Filed Jan. 22, 1925 2 Sheets-Sheet 1

INVENTOR:

Herbert Frankel,

BY Geo. Wm. Miath

ATTORNEY.

June 1, 1926. Re. 16,357

H. FRANKEL

COMBINATION GARMENT FOR FEMININE WEAR

Original Filed Jan. 22, 1925 2 Sheets-Sheet 2

INVENTOR.

Herbert Frankel,

BY Geo. Wm. Hiatt

ATTORNEY

Reissued June 1, 1926. Re. 16,357

UNITED STATES PATENT OFFICE.

HERBERT FRANKEL, OF NEW YORK, N. Y., ASSIGNOR TO FRANCO CORSET COMPANY, INC., OF NEW YORK, N. Y.

COMBINATION GARMENT FOR FEMININE WEAR.

Original No. 1,545,245, dated July 7, 1925, Serial No. 3,932, filed January 22, 1925. Application for reissue filed September 19, 1925. Serial No. 57,478.

The object of my invention is to afford a unitary combination and arrangement of step in corset and brassière whereby the brassière section or portion of the garment is detachably secured to the corset portion thereof, so as to facilitate change for cleaning, replacement, or substitution, etc., substantially in the manner hereinafter set forth,—the invention consisting in the specific formation and construction of parts described and claimed whereby these and other advantageous results are attained.

In the accompanying drawings I illustrate a practical embodiment of the essential features of my improvements in a combination garment of the character designated, although I do not restrict myself to the identical configuration and construction of component parts and appurtenances shown by way of exemplification, since changes in form and make of minor details, and equivalent expedients may be resorted to with like results, and without departing from the spirit and intent of my invention in this respect.

With this understanding:—

Figure 3:
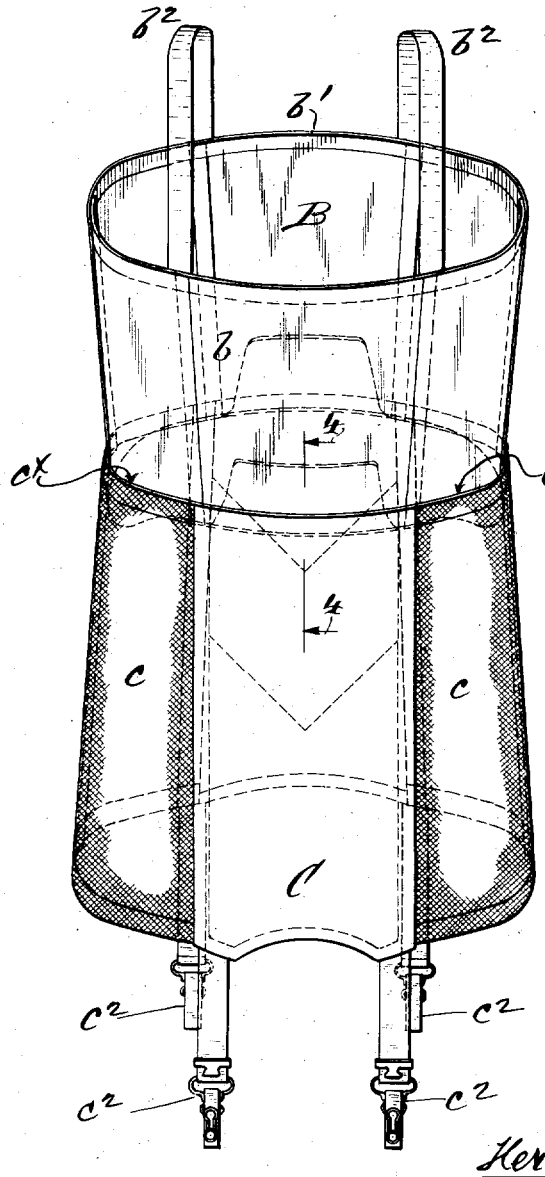
Figure 4:
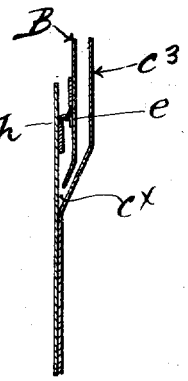

Fig. 3, a perspective view of the unitary combination of the two said sections of the garment;

Fig. 4, is a detail section taken upon plane of line 4—4, Fig. 3, through the conjunctive portion only of the front of the garment.

I am aware that heretofore corsets have been made with brassière portions permanently incorporated therewith, and the novelty in the present instance consists essentially in so constructing both the corset and the brassière that they can be conveniently but detachably connected in such manner as to constitute a single unitary garment, or separated for any purpose desired, as for the cleaning or renovation of the brassière, the substitution of a new one, or one of a different trim or color, to suit requirements, or the preference of the user.

Thus, under previous conditions, as in the case of the permanent attachment between corset and brassière referred to if it became desirable to wash the brassiere portion of the garment, which is more or less exposed in use and has a tendency to become soiled along its upper edge and shoulder straps, it has been necessary to tightly hold the lower or corset portion of the garment during the cleansing process, a difficult and troublesome operation, or to resort to scissors or equivalent means for the purpose of severing the stitching by which the parts were originally and integrally united to form a unitary brassière-trimmed corset, thus involving the reuniting of the component parts of the garment by subsequent machine or hand stitching, or the discarding of the garment in its entirety and the purchase of a new one.

Figure 2:
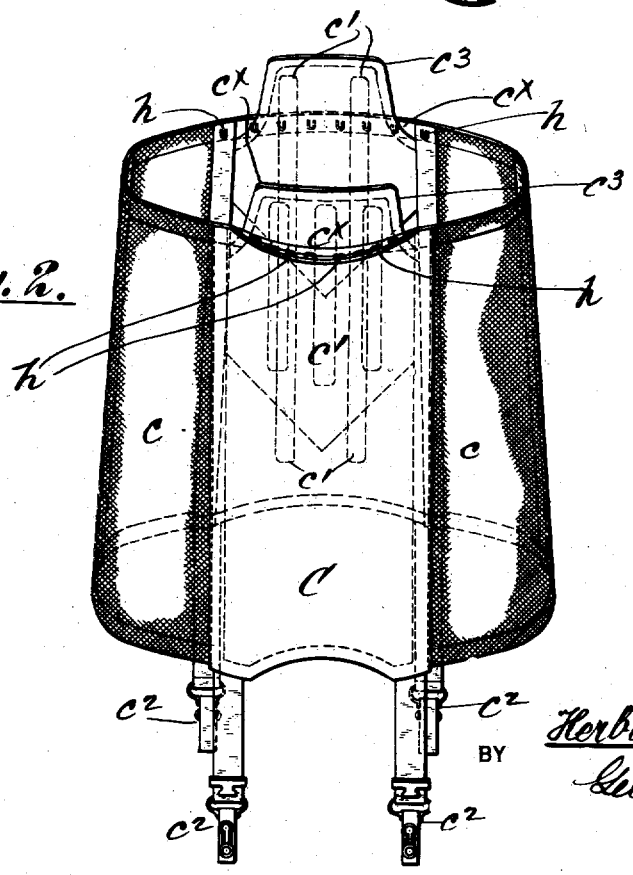
Fig. 2, is a perspective view of the corset section of the garment, detached.

I have herein shown the lower or corset portion C, of my combination garment as of the well known continuous or "step-in" type, although it may be of the side hook or any other structure preferred, provided with the usual elastic resilient side inserts $c$, $c$, the stiffeners $c'$, $c'$, and the pendent garters $c^2$, $c^2$, and otherwise formed in accordance with custom in this and other respects, a new feature however, in the present case, being the formation of the corset body with front and rear upper extensions $c^3$, $c^3$, into which the stiffeners $c'$, $c'$, extend, as indicated by dotted lines particularly in Fig. 2, of the drawings. These reinforced extensions $c^3$, $c^3$, perform a double function in that they not only constitute side walls for the pocket grooves $c^x$, $c^x$, in which the copulative means are encased when the two sections of the garment are united, as in Fig. 3, but also afford support for the adjacent portions of the body of the wearer, and distribute the strain or tension incidental to the connective junction between the two parts of the unitary garment, as worn.

The connective means provided for detachably uniting the corset section C, and the brassière section B, may consist of hooks $h$, and eyes $e$, as shown in the drawings, or of snap hooks or other suitable or well known mechanical equivalents, as may be preferred or found most expedient.

Figure 1:
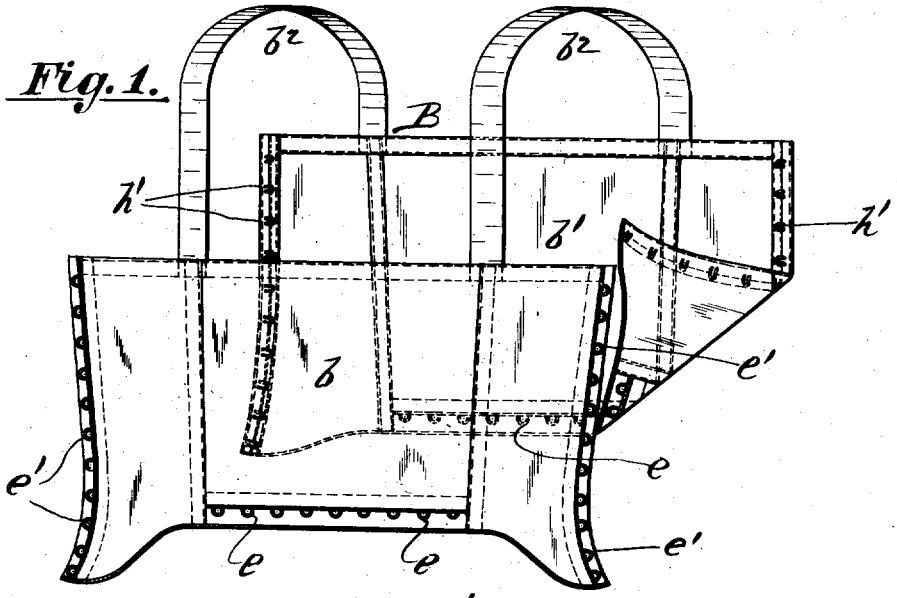
Fig. 1, represents a perspective view of the brassière section of the garment, detached.

The brassière section B, shown in the drawings by way of exemplification consists of a front panel $b$, and a rear panel $b'$, united by the shoulder straps $b^2$, $b^2$. When made in two parts, as illustrated more particularly in Fig. 1, of the drawings, the side edges are formed to overlap, and provided with series of interlocking devices, as the hooks $h'$, and eyes $e'$, or equivalent desirable fastenings; and the front and rear lower edges of each panel are provided with means for attachment to the upper edges of the corset, as by eyes $e$, engageable with hooks $h$, on the corset, it being understood that an alternative arrangement of interlocking means may be resorted to if preferred, in that the hooks $h$, might be positioned on the brassière and the eyes $e$, on the corset, or that equivalent interlocking means might be substituted in lieu of the hooks and eyes, as for instance snap hooks, buttons and button holes, or any other expedient, with substantially like results.

In Fig. 2, the upper front edge of the corset is represented as turned back in part to show the pocket groove $c^x$, formed, as heretofore stated, between it and the frontal extension $c^3$, and in Fig. 4, the character and function of the enclosing pocket groove $c^x$, is illustrated more or less diagrammatically, the front and rear pocket grooves being of course essentially the same in form and function. This method of providing for the isolation of the fastening means is conducive to the comfort of the wearer, as well as a prevention of possible entanglement with, or injury to the underwear.

As heretofore intimated, an advantage of this construction of the component parts of my combination garment is the fact that the brassière may be speedily and easily removed from the corset, washed, ironed, and laundered, or treated in any way desired, and then replaced on the corset without affecting or injuring the latter in any manner whatsoever,—or a substitution of brassière effected when necessary or desirable.

Other incidental advantages are, that the brassière may be detached and not used in hot weather, or when décolleté evening gown is worn.

What I claim as my invention and desire to secure by Letters Patent, is:—

1. A combination garment of the character described, comprising a corset section and a brassière section, and means for detachably uniting said component parts, the corset section being formed with front and rear upward extensions forming with the overlying portion of the corset front and rear pockets for the said uniting means.

2. A combination garment of the character described, comprising a corset section and a brassière section, and means for detachably uniting said component parts, the corset section being formed with a front upward extension forming with the coinciding overlapping portion of the corset a front pocket for detachable uniting means.

3. A combination garment of the character described, comprising a corset section and a brassière section, and means for detachably uniting said component parts, the corset section being formed with a rear upward extension forming with the coinciding overlapping portion of the corset a rear pocket for detachable uniting means.

4. A combination garment of the character described, comprising a corset section and a brassière section, and means for detachably uniting said component parts, the corset section being formed with an upward extension forming with the coinciding overlapping portion of the corset a pocket for detachable uniting means.

HERBERT FRANKEL.